United States Patent [19]

Boaz

[11] Patent Number: 5,004,284
[45] Date of Patent: Apr. 2, 1991

[54] METHOD AND APPARATUS FOR SUPPORTING A SHEET OF GLASS

[75] Inventor: Premakaran T. Boaz, Livonia, Mich.

[73] Assignee: Ford Motor Company, Dearborn, Mich.

[21] Appl. No.: 440,165

[22] Filed: Nov. 22, 1989

[51] Int. Cl.⁵ .............................................. B66C 1/48
[52] U.S. Cl. .................................. 294/118; 294/902
[58] Field of Search ............... 294/16, 92, 101, 103.1, 294/104, 106, 113, 114, 118, 119, 902

[56] References Cited

U.S. PATENT DOCUMENTS

| | | |
|---|---|---|
| 942,356 | 12/1909 | Shelley . |
| 1,090,010 | 3/1914 | Armstrong et al. . |
| 1,674,485 | 11/1926 | Smith . |
| 1,704,548 | 11/1926 | Alberg . |
| 1,751,155 | 7/1927 | Heny et al. . |
| 1,765,783 | 6/1930 | Young . |
| 1,913,611 | 6/1933 | Ornsteen ............................ 294/104 X |
| 2,174,254 | 9/1939 | Black ................................ 294/118 X |
| 2,473,764 | 6/1949 | Park ................................. 294/104 X |
| 2,710,493 | 12/1951 | Glynn . |
| 3,089,727 | 5/1963 | Hay ...................................... 294/118 |
| 3,336,825 | 8/1967 | Cashion . |
| 3,363,930 | 1/1968 | Webb .................................... 294/118 |
| 3,456,985 | 7/1969 | Bullock ................................. 294/119 |
| 3,904,027 | 9/1975 | Gilles et al. ....................... 294/114 X |
| 4,109,953 | 8/1978 | Seymour ................................ 294/118 |
| 4,760,912 | 8/1988 | Vaida ............................... 294/103.1 X |
| 3,6755,233 | 4/1972 | Twist .................................. 294/118 |

FOREIGN PATENT DOCUMENTS

| | | | |
|---|---|---|---|
| 1944674 | 4/1971 | Fed. Rep. of Germany ...... 294/118 |
| 455300 | 10/1936 | United Kingdom ............... 294/118 |

*Primary Examiner*—Johnny D. Cherry
*Attorney, Agent, or Firm*—Roger L. May; Charles H. Ellerbrock

[57] ABSTRACT

An apparatus and method for supporting a sheet of glass contemplates a first support element, having a flat, circular support surface with a diameter of between approximately 0.125 inch and 0.25 inch, and a second support element, having a sharp support edge. The support elements are themselves supported such that the first and second support elements are urged toward each other. By this arrangement, the flat support surface of the first support element is brough into contact with a first side of a sheet of glass, and the sharp support edge of the second support element is brough into contact with a second side of a sheet of glass. A pair of stop elements are provided on the support elements for limiting the movement of the first and second support elements, such that when the glass is heated, the sharp support edge will dig into the surface of the glass only to a predetermined depth of approximately between 0.005 inch and 0.020 inch. By this arrangement, substantial thermal insulation is not provided for a sheet of glass held between the support elements.

15 Claims, 2 Drawing Sheets

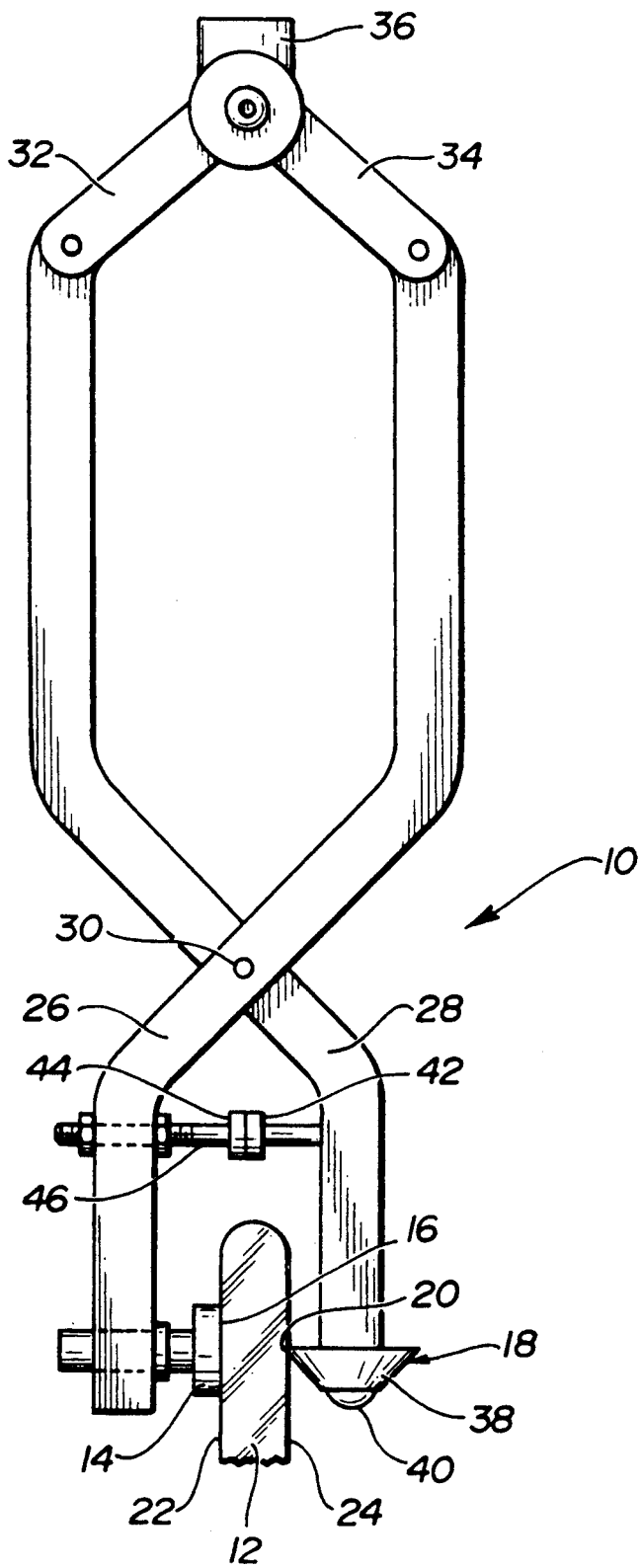

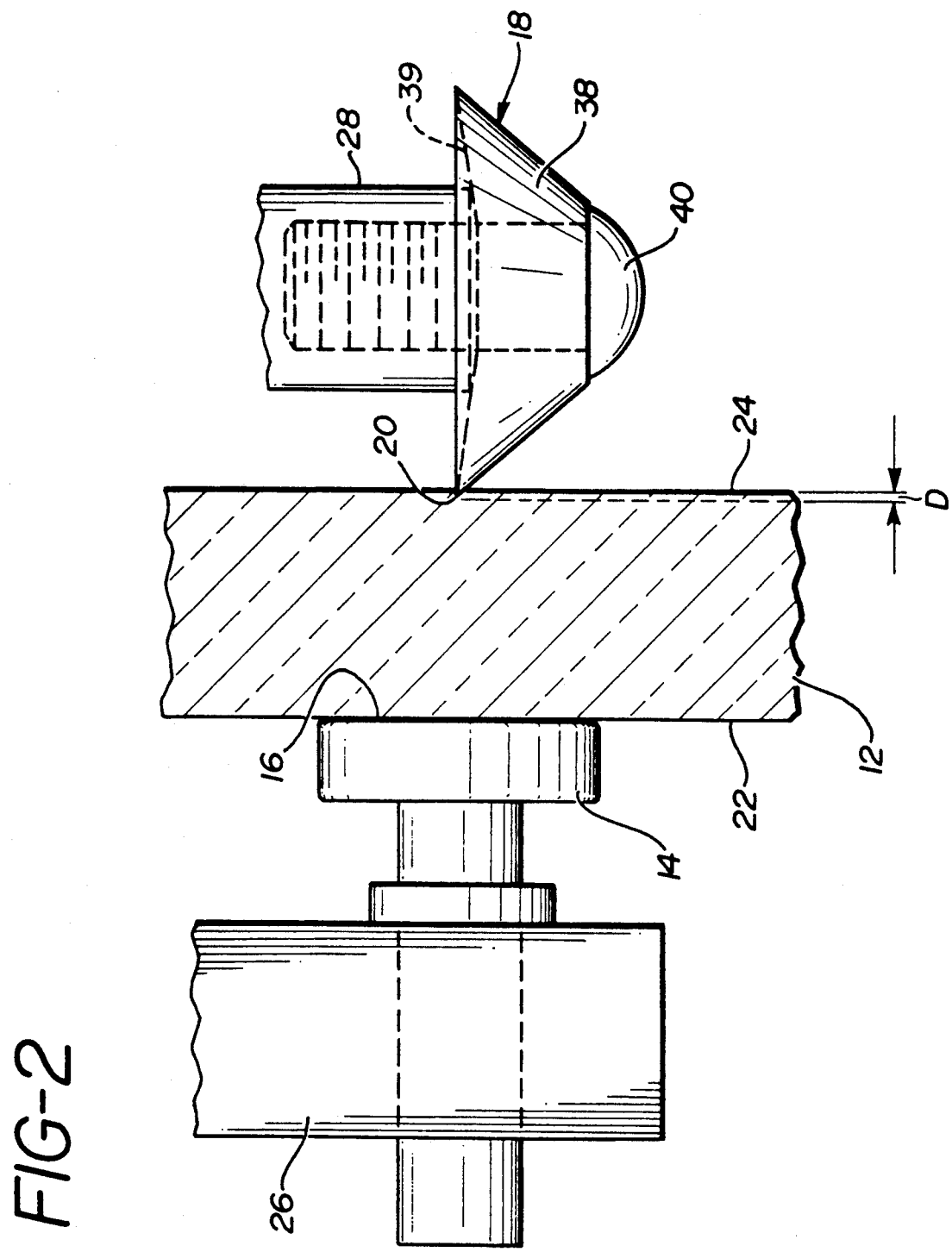

METHOD AND APPARATUS FOR SUPPORTING A SHEET OF GLASS

BACKGROUND OF THE INVENTION

The present invention relates to a method and an apparatus for supporting a sheet of glass and, more particularly, to such a method and apparatus in which a sheet of glass may be supported during heating and cooling operations without significantly affecting the surface of the glass sheet, and without providing undue thermal insulation over the surface of the glass sheet.

In various glass forming and treatment operations, such as those for forming and tempering sheets of glass for use in automobiles, it is necessary that the sheets of glass be supported and transported to a succession of stations. At some stations, the glass sheets may be heated and then formed. At other stations, the glass sheets may be heated and then quickly chilled to temper the glass. In tempering sheets or panels of glass, it has been common in the past to support glass sheets near their upper edges by tongs which are suspended from a carrier. The carrier transports the glass sheets into and out of a heat treating furnace. U.S. Pat. No. 2,710,493, issued June 14, 1955, to Glynn, discloses such a glass carrier arrangement. In the Glynn tong arrangement, a metal rod is inserted between the arms of the tongs, prior to conveying the tongs, and a glass sheet carried by the tongs, into a heat treatment oven. This rod avoids the problem of the tongs biting too deeply into the glass after the glass is softened by the heat treatment process. The rod blocks the arms from moving too close together, thereby preventing the jaws of the tongs from imbedding themselves further into the glass when it becomes softened in the furnace.

Several difficulties are encountered with a tong support arrangement such as disclosed in the Glynn patent. Since the jaws of the tongs include round pointed screws which contact the glass sheet, unsightly indentations are made on both sides of the glass sheet as it is heated in the oven, the rod extending between the arms of the tongs not withstanding. Further, in view of the rather substantial surface area of the tongs in contact with the glass surface during heating and chilling operations, the tongs tend to thermally insulate the sheet of glass in the area of contact from the heating and cooling cycles, thus preventing the glass from being tempered in this region.

It is seen, therefore, that there is a need for a method and apparatus for supporting a sheet of glass in which marring of the surface of the sheet is minimized. Further, there is a need for a method and apparatus for supporting a sheet of glass in which the glass is not significantly thermally insulated, thereby facilitating heating and cooling of the glass sheet.

SUMMARY OF THE INVENTION

These needs are met by a method and an apparatus for supporting a sheet of glass according to the present invention. The method of supporting a sheet of glass includes the steps of: providing a first support element, having a flat support surface; providing a second support element, having a sharp support edge; moving the first and second support elements toward each other such that the flat support surface of the first support element is brought into contact with a first side of a sheet of glass, and the sharp support edge of the second support element is brought into contact with a second side of a sheet of glass; and limiting the movement of the first and second support elements, such that when the glass is heated, the sharp support edge will dig into the surface of the glass only to a predetermined depth.

The step of providing a first support element, having a flat support surface, preferably comprises the step of providing a first support element having a flat support surface which is circular in shape with a diameter of approximately 0.125 inch to 0.250 inch.

The step of providing a second support element, having a sharp support edge, preferably comprises the step of providing a second support element having a sharp support edge defined by a circular element. The step of providing a second support element, having a sharp support edge defined by a circular element, may further comprise the step of providing the upper surface of the circular element with a downward rake angle of approximately 7 degrees.

The step of limiting the movement of the first and second support elements, such that when the glass is heated the sharp support edge will dig into the surface of the glass only to a predetermined depth, preferably includes the step of limiting the movement of the first and second support elements, such that when the glass is heated, the sharp support edge will dig into the surface of the glass only to a depth of between 0.005 inch and 0.020 inch.

The step of moving the first and second support elements toward each other such that the flat support surface of the first support element is brought into contact with a first side of a sheet of glass, and the sharp support edge of the second support element is brought into contact with a second side of a sheet of glass, preferably includes the step of pivotally supporting the first and second support elements such that the weight of the elements tends to cause the flat support surface and the sharp support edge to move toward each other.

The step of limiting the movement of the first and second support elements, such that when the glass is heated, the sharp support edge will dig into the surface of the glass only to a predetermined depth, preferably includes the step of providing stop elements on the first and second support elements which come into contact as the first and second support elements move together whereby the movement of the first and second support elements is limited.

The apparatus according to the present invention for supporting a sheet of glass comprises: a first support element, having a flat support surface; a second support element, having a sharp support edge; means for supporting the first and second support elements whereby the first and second support elements are urged toward each other such that the flat support surface of the first support element is brought into contact with a first side of a sheet of glass, and the sharp support edge of the second support element is brought into contact with a second side of a sheet of glass; and means for limiting the movement of the first and second support elements, such that when the glass is heated the sharp support edge will dig into the surface of the glass only to a predetermined depth.

The first support element has a flat support surface which preferably is circular in shape with a diameter of approximately 0.125 inch to 0.250 inch.

The second support element has a sharp support edge preferably defined by a circular element with a downward rake angle of approximately 7 degrees.

The means for limiting the movement of the first and second support elements, such that when the glass is heated, the sharp support edge will dig into the surface of the glass only to a predetermined depth, preferably comprises means for limiting the movement of the first and second support elements, such that when the glass is heated, the sharp support edge will dig into the surface of the glass only to a depth of between 0.005 inch and 0.020 inch.

The means for supporting the first and second support elements whereby the first and second support elements are urged toward each other, such that the flat support surface of the first support element is brought into contact with a first side of a sheet of glass and the sharp support edge of the second support element is brought into contact with a second side of a sheet of glass, preferably comprises means for pivotally supporting the first and second support elements such that the weight of the elements tends to cause the flat support surface and the sharp support edge to move toward each other.

The means for limiting the movement of the first and second support elements, such that when the glass is heated, the sharp support edge will dig into the surface of the glass only to a predetermined depth, preferably comprises stop elements on the first and second support elements which come into contact as the first and second support elements move together whereby the movement of the first and second support elements is limited. The stop elements may preferably be adjustable to accommodate varying thicknesses of glass sheets.

Accordingly, it is an object of the present invention to provide a method and an apparatus for supporting a sheet of glass in which the glass sheet may be securely held without undue marring of the surface of the sheet as the sheet is heated and cooled, and to provide such a method and apparatus in which the thermal insulation provided by the apparatus to the sheet is minimized.

Other objects and advantages of the invention will be apparent from the following description, the accompanying drawings and the appended claims.

BRIEF DESCRIPTION OF THE DRAWINGS

FIG. 1 is a side view of the apparatus for supporting a glass sheet according to the present invention; and FIG. 2 is an enlarged view of the lower portion of FIG. 1, with the glass sheet in section.

DETAILED DESCRIPTION OF THE PREFERRED EMBODIMENTS

Reference is made to FIGS. 1 and 2 of the drawings, which illustrate apparatus according to the present invention comprising tongs 10 for supporting a sheet of glass 12. The sheet of glass 12 is engaged near its upper edge by the tongs 10 so that it can be transported through a number of work stations, such as for example heating and chilling stations in a tempering operation. Although only one set of tongs is depicted, it will be appreciated that a glass sheet will be held by a plurality of tongs, with the tongs spaced along the sheet every six to twelve inches. The spacing of the tongs is dependent on the weight and shape of the sheet of glass, with heavier sheets or sheets having more severe bends requiring closer spacing.

The apparatus includes a first support element 14, having a flat support surface 16, and a second support element 18, having a sharp support edge 20. The flat support surface 16 is circular in shape, preferably having a diameter of approximately 0.125 inch to 0.250 inch, with the larger diameter surfaces being utilized with heavier glass sheets.

The apparatus further includes means for supporting the first and second support elements 14 and 18, respectively, whereby the first and second support elements are urged toward each other, engaging opposite sides of sheet 12. The flat support surface 16 of the first support element 14 is brought into contact with a first side 22 of glass sheet 12 and the sharp support edge 20 of the second support element 18 is brought into contact with a second side 24 of the sheet of glass 12. The means for supporting the first and second support elements 14 and 18 includes a pair of support arms 26 and 28 which are hinged together at 30. The upper ends of arms 26 and 28 are pivotally connected to toggle links 34 and 32, respectively, which in turn are pivotally attached to support member 36. As will be appreciated, the pivotal connection between the toggle links 32 and 34 and the arms 28 and 26, respectively, is such that the weight of the glass 12 and arms 26 and 28 tends to cause the flat support surface 16 and the sharp support edge 20 to move toward each other. Support member 36 may be attached to a conventional conveyor for transporting the tongs 10 and a sheet of glass 12.

The sharp support edge 20 is the principle mechanism by which the glass is held. This edge is defined by a circular element 38 which is generally in the shape of an inverted, truncated cone. The upper surface 39 of the circular element 38 has a downward rake angle of approximately 7 degrees, as best seen in FIG. 2. Element 38 is secured to the bottom of arm 28 by means of threaded bolt 40.

The apparatus 10 further includes stop elements 42 and 44, mounted on arms 28 and 26, respectively, as shown in FIG. 1, which provide a means for limiting the movement of the first and second support elements. As will be noted, stop element 44 includes a threaded shaft 46 which extends through arm 26 and is secured in position by lock nuts 48. By this arrangement, the movement of the first and second support elements may be adjusted to accommodate differing thicknesses of glass sheets. It will be appreciated that any one of a number of equivalent stop adjustment arrangements may be utilized. Further, the adjustment feature of the stop elements may be dispensed with if glass sheets of only one thickness are to be supported.

By including a stop arrangement, when the glass is heated, the sharp support edge 20 will dig into the surface 24 of the glass 12 only to a predetermined depth D. Depth D is preferably limited approximately to between 0.005 inch and 0.020 inch. This is sufficient to support the glass sheet, but not so deep as to produce a significant flaw in the surface of the glass. Preferably, the sharp support edge 20 engages the surface 24 of the glass that will face inward in the automobile, making the indentation in the glass surface less apparent. Since the flat surface 16 of support element 14 contacts the opposite side 22 of the sheet 12, that side of the sheet will remain completely smooth and provide a pleasing appearance when installed in a vehicle.

By the present invention, a sheet of glass may be supported and heated without significantly affecting the surface of the sheet. Additionally, when a sheet is subjected to heating and then rapid cooling, the apparatus of the present invention does not insulate a portion of the sheet surface from rapid changes in temperature. As a consequence, the sheet can be effectively tempered or otherwise treated over its entire extent.

Having described the invention in detail and by reference to the preferred embodiment thereof, it will be apparent that other modifications and variations are possible without departing from the scope of the invention defined in the appended claims.

What is claimed is:

1. A method of supporting a sheet of glass, including the steps of:
   providing a first support element, having a flat support surface,
   providing a second support element, having a sharp support edge,
   moving said first and second support elements toward each other such that said flat support surface of said first support element is brought into contact with a first side of a sheet of glass, and said sharp support edge of said second support element is brought into contact with a second side of a sheet of glass, and
   limiting the movement of said first and second support elements, such that when the glass is heated, the sharp support edge will dig into the surface of the glass only to a predetermined depth.

2. The method of supporting a sheet of glass of claim 1, in which the step of providing a first support element having a flat support surface, comprises the step of providing a first support element, having a flat support surface which is circular in shape with a diameter of approximately 0.125 inch to 0.250 inch.

3. The method of supporting a sheet of glass of claim 1, in which the step of providing a second support element, having a sharp support edge, comprises the step of providing a second support element having a sharp support edge defined by a circular element.

4. The method of supporting a sheet of glass of claim 3, in which the step of providing a second support element, having a sharp support edge defined by a circular element, comprises the step of providing the upper surface of said circular element with a downward rake angle of approximately 7 degrees.

5. The method of supporting a sheet of glass of claim 1, in which the sharp support edge will dig into the surface of the glass only to a depth of between 0.005 inch and 0.020 inch.

6. The method of supporting a sheet of glass of claim 1, in which the step of moving said first and second support elements toward each other such that said flat support surface of said first support element is brought into contact with a first side of a sheet of glass, and said sharp support edge of said second support element is brought into contact with a second side of a sheet of glass, includes the step of pivotally supporting said first and second support elements such that the weight of said elements tends to cause said flat support surface and said sharp support edge to move toward each other.

7. The method of supporting a sheet of glass of claim 1, in which the step of limiting the movement of said first and second support elements, such that when the glass is heated, the sharp support edge will dig into the surface of the glass only to a predetermined depth includes the step of providing stop elements on said first and second support elements that come into contact as said first and second support elements move together whereby the movement of said first and second support elements is limited.

8. Apparatus for supporting a sheet of glass, comprising:
   a first support element, having a flat support surface,
   a second support element, having a sharp support edge,
   means for supporting said first and second support elements whereby said first and second support elements are urged toward each other such that said flat support surface of said first support element is brought into contact with a first side of a sheet of glass, and said sharp support edge of said second support element is brought into contact with a second side of a sheet of glass, and
   means for limiting the movement of said first and second support elements, such that when the glass is heated the sharp support edge will dig into the surface of the glass only to a predetermined depth.

9. The apparatus for supporting a sheet of glass of claim 8, in which said first support element has a flat support surface which is circular in shape with a diameter of approximately 0.125 inch to 0.250 inch.

10. The apparatus for supporting a sheet of glass of claim 8, in which said second support element has a sharp support edge defined by a circular element.

11. The apparatus for supporting a sheet of glass of claim 10, in which the upper surface of said circular element has a downward rake angle of approximately 7 degrees.

12. The apparatus for supporting a sheet of glass of claim 8, in which said means for limiting the movement of said first and second support elements, such that when the glass is heated, the sharp support edge will dig into the surface of the glass only to a predetermined depth comprises means for limiting the movement of said first and second support elements, such that when the glass is heated, the sharp support edge will dig into the surface of the glass only to a depth of between 0.005 inch and 0.020 inch.

13. The apparatus for supporting a sheet of glass of claim 8, in which said means for supporting said first and second support elements whereby said first and second support elements are urged toward each other such that said flat support surface of said first support element is brought into contact with a first side of a sheet of glass and said sharp support edge of said second support element is brought into contact with a second side of a sheet of glass, comprises means for pivotally supporting said first and second support elements such that the weight of said elements tends to cause said flat support surface and said sharp support edge to move toward each other.

14. The apparatus for supporting a sheet of glass of claim 8, in which said means for limiting the movement of said first and second support elements, such that when the glass is heated the sharp support edge will dig into the surface of the glass only to a predetermined depth, comprises stop elements on said first and second support elements which come into contact as said first and second support elements move together whereby the movement of said first and second support elements is limited.

15. The apparatus for supporting a sheet of glass of claim 14, in which said means for limiting the movement of said first and second support elements is adjustable, whereby the movement of said first and second support elements may be adjusted to accommodate differing thicknesses of glass sheets.

* * * * *